3,455,801
HIGHLY RADIATION-SENSITIVE TELOMERIZED POLYESTERS
Gaetano F. D'Alelio, South Bend, Ind., assignor, by mesne assignments to PPG Industries, Inc., a corporation of Pennsylvania
No Drawing. Filed Mar. 2, 1966, Ser. No. 531,024
Int. Cl. C08f 3/04
U.S. Cl. 204—159.19   9 Claims

ABSTRACT OF THE DISCLOSURE

Telomerized diacrylyl polyesters are obtained by reacting dicarboxylic acids with polyhydric alcohols having end groups capped by acrylic and methacrylic groups. These polyesters have the formula

where $n$ is 1 to 14, R is a single valence bond or a divalent unsaturated aliphatic hydrocarbon radical; R' is a divalent aliphatic hydrocarbon radical and R" is hydrogen or methyl. These polyesters cure when subjected to relatively low doses of ionizing radiation.

---

This invention in general deals with radiation-sensitive polymers. Particularly it concerns viscous, soluble, flowable, relatively low molecular weight polymers, known as oligomers, which, when subjected to ionizing radiation become insoluble and infusible. More specifically, it deals with telomerized polyesters which, on irradiation, convert to three-dimensional crosslinked, insoluble, infusible polymers at relatively low doses of ionizing radiation.

The telomerized polyesters used in the practice of this invention are linear polyesters which are derived from the condensation of unsaturated aliphatic, including cycloaliphatic, polycarboxylic acids with saturated or unsaturated aliphatic, including cycloaliphatic, polyhydric alcohols whose end groups are capped by the highly radiation-sensitive acrylyl group,

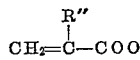

The simplest telomerized polyesters used in the practice of this invention are those prepared from the reaction of one mole of an unsaturated aliphatic dicarboxylic acid, $R(COOH)_2$, two moles of a diol, $R'(OH)_2$, and two moles of an acrylic acid,

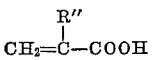

and have the general formula,

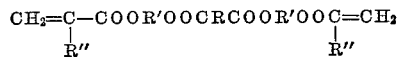

for example,

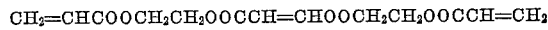

and

In these formulas, R represents a divalent unsaturated aliphatic, including cycloaliphatic, hydrocarbon radical having 2–10 carbon atoms; R' is a divalent saturated or unsaturated aliphatic (including cycloaliphatic) hydrocarbon radical having 1–10 carbon atoms; and R" is hydrogen or $CH_3$.

Instead of the free acids, $R(COOH)_2$ and $$CH_2=CHCOOH$$

suitable derivatives such as their anhydrides, acid chlorides, or omega hydroxyalkyl esters may be used in the synthesis of these polyesters, and also instead of the diols, $R'(OH)_2$, the corresponding alkylene oxides,

can, when available, also be used, wherein R''' is H or an alkyl group containing 1 to 10 carbon atoms.

Telomerized polyesters with a greater number of repeating segments, and therefore of higher molecular weight than the simplest polyesters, are prepared by increasing the ratio of the $n$ moles of dicarboxylic acid and the $n+1$ moles of the diol to the 2 moles of acrylic acid to maintain the molar ratio of diacid:diol:acrylic at $n:(n+1):2$. Thus it may be seen that the simplest polyester is obtained with one mole of diacid; two moles of diol and two moles of acrylic acid. When the value of $n$ is increased for the dicarboxylic acid to 2, the value for the diol becomes 3 and that for the acrylic function remains constant at 2.

In the case where $n$ equal 1, the synthesis of these telomerized oligomers can be accomplished by any or all of the following reactions, since it is immaterial in which order the reactants are combined. The conditions used are those appropriate for the normal reactions of alcohols with acids, anhydrides, and acid halides for the formation of esters, and also those normally used, for the reaction of the glycidyl group with the acids.

$$R(COOH)_2 + 2R'(OH)_2 \longrightarrow$$

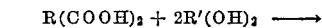
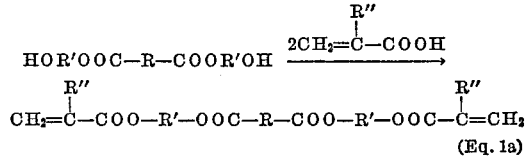

(Eq. 1a)

or

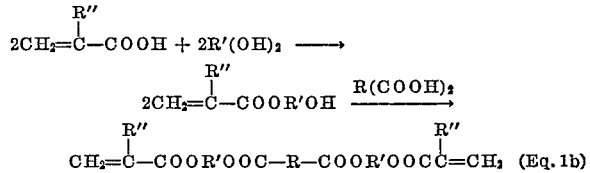

(Eq. 1b)

or

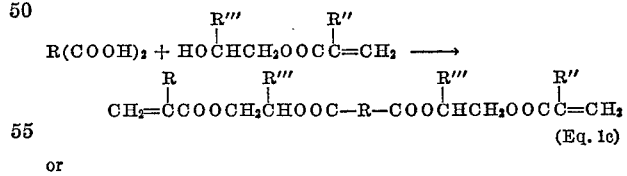

(Eq. 1c)

or $$R(CO)_2O + 2R'(OH)_2 \longrightarrow$$

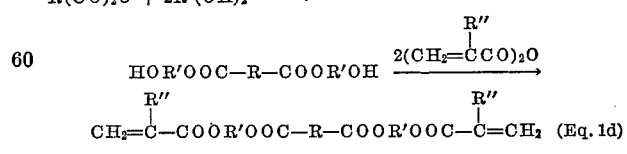

(Eq. 1d)

or $$R(CO)_2O + 2R')OH)_2 \longrightarrow$$

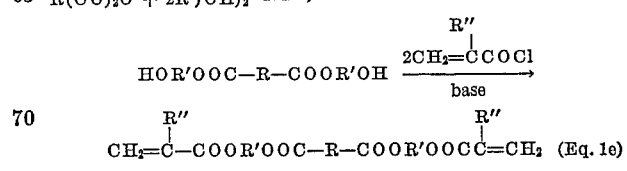

(Eq. 1e)

or $$R(COCl)_2 + 2R'(OH) \xrightarrow{base}$$

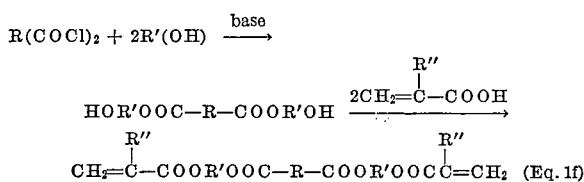

(Eq. 1f)

or $$R(COOH)_2 + 2R'''CHCH_2 \longrightarrow$$
$$\underset{O}{\diagdown\diagup}$$

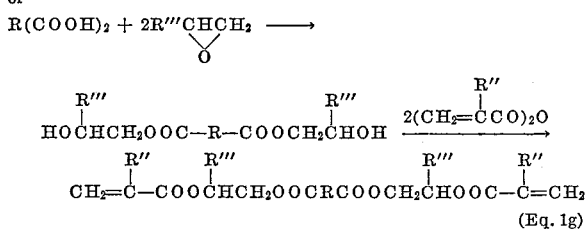

(Eq. 1g)

Oligomers in which the value of $n$ is larger than 1 are readily prepared by the same reactions as given hereinabove by simply changing the ratio of the dicarboxylic acid to the desired value of $n$ and that of the diol to $n+1$ while maintaining the molar quantity of the acrylic moiety at 2, thus $$nR(COOH)_2 + (n+1)R'(OH)_2 \longrightarrow$$

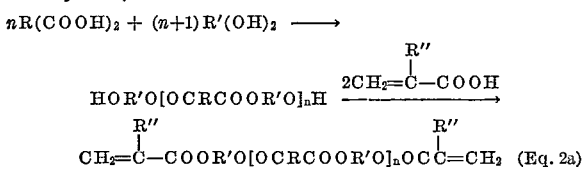 (Eq. 2a)

Accordingly the radiation-sensitive telomerized polyesters useful in the practice of this invention have the formula

wherein $n$ represents a numerical value of 1 to 14; R represents a divalent unsaturated aliphatic (including cycloaliphatic) hydrocarbon radical having 2–10 carbon atoms; and R′ represents a divalent aliphatic hydrocarbon radical, (saturated or unsaturated and including cycloaliphatic) containing 2–10 carbon atoms; and R″ represents hydrogen or —CH$_3$. In other words,

—OOCRCOO— represents the dicarboxylic radicals derived from maleic, fumaric, itaconic, citraconic acids, etc.

Depending on the nature of R, R′ and R″ the viscosity of these telomerized polyesters increases from about 100 to 9000 centistokes at 20° C. as the value of $n$ increases from 1 to 14. Also depending on the values of $n$, R′ and R″, the molecular weight of these telomerized esters will vary from about 275 for the lowest one at a value of $n=1$ to about 8800 for $n$ equal to 14 when the diacid is decenedicarboxylic acid and the diol is dodecanediol.

Some illustrative examples of the various HO—R′—OH alcohols which can be used in synthesizing the telomerized polyesters used in this invention are ethylene glycol, trimethylene glycol, tetramethylene glycol, 2,3-dihydroxybutane, 1,4-dihydroxybutane, 1,4-dihydroxy-2-ethylbutane, 1,6 - dihydroxyhexane, 1,8 - dihydroxyoctane, 2,10 - dihydroxydecane, 1,4-dihydroxycyclohexane, 1,4-dimethylolcyclohexane, 2,2-diethyl-propanediol, 1,3, 2,2-dimethylpropanediol, 1,3,3-methylpentanediol, 1,4, 2,2-diethylbutanediol - 1,3, 4,5 - dihydroxynonane, pentamethylene glycol, heptamethylene glycol, nonamethylene glycol, decamethylene glycol, diethylene glycol, triethylene glycol, propylene glycol, dipropylene glycol, butene-2-diol-1,4, 2,7-dihydroxy-n-hexene-4, 2,7-dihydroxy-2,7-dimethyl-n-hexene-4, 2-ethylhexanediol-1,3, etc. Alkylene oxides can also be used to give corresponding glycol derivatives, such as propylene oxide, ethylene oxide, 2,3-butylene oxide, etc.

Some illustrative examples of the various

HOOC—R—COOH acids which can be used in preparing the telomerized polyesters used in the practice of this invention are maleic, fumaric, itaconic, citraconic, mesaconic, acetylene dicarboxylic, aconitic, alpha-methyl-itaconic, alpha,alpha-dimethyl-itaconic, 1,2 - tetrahydrophthalic, 1,3 - tetrahydrophthalic, 1,4-tetrahydrophthalic, trans-1,4-cyclohexenedicarboxylic acids, etc. For the purpose of this invention, 70 percent or more of the repeating unit segments derived from dicarboxylic acid should be of the unsaturated type. The remaining dicarboxylic acid segments can be saturated aliphatic type.

It is most important to note that the various classes of telomerized polyesters used in the practice of this invention contain aliphatic hydrocarbon structures in their polycarboxylic acid and polyhydric alcohol segments. It is because of this aliphatic character that these telomerized polyesters are highly responsive to ionizing radiation, and in fact, substitution of any of the aliphatic polycarboxylic acids by aromatic carboxylic acids or substitution of the aliphatic polyhydric alcohol by aromatic alcohols, decreases the response to ionizing irradiation to such a point that they are not economically feasible.

As an example, the dimethacrylyl telomerized polyethylene maleate,

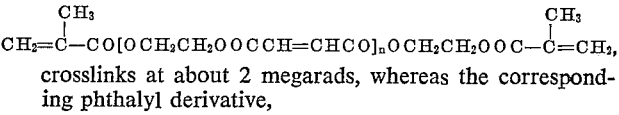

crosslinks at about 2 megarads, whereas the corresponding phthalyl derivative,

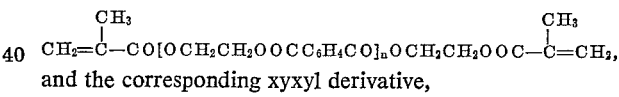

and the corresponding xyxyl derivative,

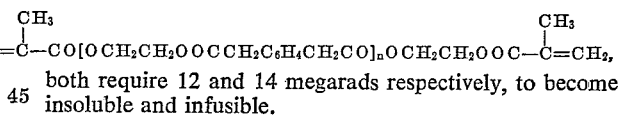

both require 12 and 14 megarads respectively, to become insoluble and infusible.

This difference is surprising particularly because these three telomerized esters all cure with radical initiators such as with 1% benzoyl peroxide in about 90 to 95 seconds at 100° C., and with redox systems of cobalt acetate and tertiary butyl hydroperoxide in three to three and one-half hours at room temperature. This difference is due apparently to the fact that aromatic ring compounds such as phenyl, naphthyl and the like are energy sinks for irradiation.

It will be noted too that the aliphatic hydrocarbon structures in the polycarboxylic and polyhydric alcohol segments are unsaturated. This is for the purpose of imparting rigidity to the irradiated products. While the unsaturation in the acrylyl groups at the ends of the telomerized dicaryl polyester is more easily available for crosslinking and insures more immediate and more easily attained crosslinking, the unsaturation provided along the linear chain of the telomerized polyester by virtue of the unsaturation in the unsaturated dicarboxylic acid groups permits a greater number of crosslinkages in a polymer molecule and thereby imparts a more rigid character to the resultant irradiated polyester.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta-rays, the radiation produced by accelerated high energy electrons has been found to be very conveniently and economically applicable and to give very satisfactory results. However, regardless of the type of irradiation and the type of equipment used for its generation or application, the use thereof in the practice of the invention as described herein is contemplated as falling within the scope of this invention so long as the ionization radiation is equivalent to about 100,000 electron volts.

While there is no upper limit to the electron energy that can be so applied advantageously, the effects desired in the practice of this invention can be accomplished without having to go above about 20,000,000 electron volts. Generally, the higher the electron energy used, the greater is the depth of penetration into the massive structure of the materials to be treated, and the shorter is the time of exposure required to accomplish the desired result. For other types of irradiation, such as gamma and X-rays, energy systems equivalent to the above range of electron volts are desirable.

It is intended that the term "irradiation" includes what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiations can also be obtained by the used of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example, cobalt 60.

Various types of high power electron linear accelerators are commercially available, for example, the Arco type travelling wave accelerator, model Mark I, operating at 3 to 10 million electron volts, such as supplied by High Voltage Engineering Corporation, Burlington, Mass., or other types of accelerators as described in United States Patent No. 2,763,609 and in British Patent No. 762,953 are satisfactory for the practice of this invention.

In the following examples, the radiation doses are reported in megarads, which represent 1,000,000 rads. A "rad" is defined as the unit of absorbed dose and is equal to 100 ergs per gram.

Many monomers as well as polymers have been subjected to ionizing radiation to convert them to improved or modified products. However, irradiation processes have been primarily of scientific interest and very little use of such irradiation polymer processes has been made industrially. This is primarily due to economic factors because of the cost of the ionizing radiation delivered to the system to be treated. For example, the well-known low-cost polyester systems which consist of a mixture of about equal parts by weight of styrene monomer and an unsaturated alkyd resin prepared from maleic or fumaric anhydride, phthalic anhydride and ethylene glycol or diethylene glycol can be more economically polymerized by free radical initiators than by ionizing radiation which requires about 25 to 40 megarads, depending on the formulation.

Such systems can be improved somewhat, however, by elimination of phthalic anhydride in the formulation of the polyester and substituting the higher cost monomeric acrylic esters for the styrene. Even in such systems, the economic factors are unfavorable not only because of the much higher cost of the mixture but because of the high volatility of the acrylic or methacrylic esters used. Even in such cases the irradiation dose required is of the order of 18 to 20 megarads and the systems are highly inhibited by oxygen. The addition of substances such as acetone or methyl ethyl ketone can reduce the required dose to 9 to 12 megarads. Even then the products possess the undesirable odor of unpolymerized acrylic monomer.

In contrast, by the use of the acrylyl telomerized polyesters used in the practice of this invention and described hereinabove, crosslinked, insoluble, infusible polymers can be prepared readily by subjecting the polyesters to ionizing radiation in doses of less than 8 megarads and in some cases to doses of 0.5 megarad or less, generally preferably at least about 1 megarad. Irradiation dosages in this range are economical.

Furthermore, the acrylyl components in these telomerized polyesters are located at the ends of the polyester chains where they can more effectively crosslink. More important, the acrylyl components comprise a minor portion of the composition, and are particularly economical when the value of $n$ in these telomerized polyesters is at least 2. In addition, because the molecular weight of the telomerized polyester is much higher than a corresponding simple monomer such as methyl methacrylate or ethyl acrylate, it can function in a single molecule both as monomer and as polymer.

This property of crosslinking at economical radiation doses is maintained when these telomerized polyesters are admixed with unsaturated alkyd resins alone or in the presence of other polymers provided the unsaturated alkyd resin and the other polymers are of the nonaromatic type, that is, they are free of aromatic rings which act as energy sinks and retard the crosslinking reaction. One of the advantages of these diacrylyl polyesters is their compatibility with various types of resins, particularly polyester or alkyd types.

A few illustrative examples of suitable polymers which may be dissolved in or mixed with the telomerized polyesters of this invention along with the unsaturated alkyd resins are the nonaromatic type polymers such as polyvinyl acetate, polyethyl acrylate, polymethyl methacrylate, cellulose acetate, cellulose butyrate, ethyl cellulose, polyethylene adipate, polyethylene azeleate, polydecamethylene succinate, polydecamethylene sebacate, etc. The telomerized polyesters are also compatible with polyvinyl chloride, particularly upon the application of moderate heat.

The telomerized polyesters of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or nonvolatile solvents of a nonaromatic nature best suited to the particular application. The products resulting from the irradiation of the telomerized polyesters of this invention can vary from soft flexible bodies to hard rigid masses.

The telomerized radiation-sensitive polyesters of this invention are particularly useful in the preparation of copolymers with unsaturated alkyd resins. In carrying this portion of the invention into effect, an esterification product of a polyhydric alcohol and an alpha, beta, unsaturated polycarboxylic acid is first prepared in accordance with techniques now well known to those skilled in the alkyd resin art.

Any aliphatic polyhydric alcohol containing at least two esterifiable aliphatic hydroxy groups, or mixtures of such alcohols, can be used in preparing the unsaturated alkyl resins. Examples of such polyhydric alcohols are ethylene glycol, di-, tri-, and tetraethylene glycols, thiodiglycol, glycerine, pentaerythritol, 1,4 - dihydroxy-butene-2, dimethylol cyclohexane, dihydroxycyclohexane, etc. Any nonaromatic alpha-unsaturated, alpha,beta-polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, aconitric, cyclohexedicarboxylic, etc., itaconic and its homologues, as, for instance, alpha methyl itaconic acid, alpha,alpha-dimethyl itaconic acid, etc. Anhydrides of these polycarboxylic acids can also be employed.

In some cases, instead of using an unmodified, unsaturated alkyl resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

Anhydrides of these acids, if available, can also be used. The term "polycarboxylic acid" as used generally herein is intended to include the anhydrides of the acids.

The esterification products of polyhydric alcohols with ethylenic polycarboxylic acids, or with aliphatic polycarboxylic acids, can be further modified by introducing as a reactant in the preparation of the alkyd resin, a monesterifiable compound or compounds, more particularly a saturated or unsaturated rated monocarboxylic acid, or mixture thereof, or both such estirifiable monohydroxy organic compounds as well as by the use of hydroacids.

Examples of nonaromatic monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic, propionic, butyric to stearic, inclusive, hexahydrobenzoic, hexahydrotoluic, furoic acids, etc.

The monoesterifiable compounds can be introduced into the esterification before, during, or after the esterification of the polyhydric alcohol with the polycarboxylic acid under conditions that promote interesterification of the monoesterifiable compound with the incompletely esterified polyhydric alcoholpolycarboxylic acid product. That is, the monoesterifiable compound is introduced into the reaction mass before all of the acid groups of the polyhydric acid, or all of the alcohol groups of the polyhydric alcohol have been esterified.

The term "unsaturated nonaromatic alkyd resins," as used generally herein and in the appended claims, is intended to include within its meaning both unmodified esterification products of a nonaromatic polyhydric alcohol with a nonaromatic alpha-unsaturated, alpha, beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the telomerized polyesters of this invention, a solution or mixture of the unsaturated alkyd resin in the telomerized polyesters is first effected. Copolymerization of the components of the mixture is achieved rapidly and advantageously by ionizing radiation, such as by atomic radiation from a reactor, or from cobalt 60, or by means of high energy electrons generated by an electron linear accelerator.

Typical examples of unsaturated alkyd resins are:

ALKYD RESIN A—ETHYLENE GLYCOL ITACONATE

Parts (by wt.)
Ethylene glycol _____ 23
Itaconic acid _____ 52

The components are mixed and slowly heated in the course of one hour from room temperature to 190° C., in an inert nitrogen atmosphere, and held at this temperature for three to five hours.

ALKYD RESIN B—ETHYLENE GLYCOL MALEATE

Parts (by wt.)
Ethylene glycol _____ 31
Maleic anhydride _____ 32

The compounds are mixed and heated as in the preparation of alkyd resin A to 180° C., and held at that temperature for four to six hours.

ALKYD RESIN C—ACETIC ACID-MODIFIED DIETHYLENE GLYCOL MALEATE

Parts (by wt.)
Diethylene glycol _____ 106
Maleic anhydride _____ 88
Acetic anhydride _____ 10

The ingredients are mixed together and refluxed for one hour in an inert atmosphere of nitrogen after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixtures of such resins. As illustrative examples of other unsaturated alkyd resins, the following esterification products can be used, as illustrated in alkyd resins D and I. Aromatic alkyd resin J is included for comparison.

| Alkyd Resin | Components (parts) |
| --- | --- |
| D | Diethylene glycol (160).<br>Maleic anhydride (147). |
| E | Diethylene glycol (106).<br>Itaconic acid (130). |
| F | Glycerine (18.4).<br>Itaconic acid (39.0). |
| G | Ethylene glycol (6.0).<br>Maleic anhydride (19.6).<br>Hydroxypropyl acrylate (26.0). |
| H | Ethylene glycol (20).<br>Maleic anhydride (29.4).<br>Succinic acid (3.3). |
| I | Diethylene glycol (30.6).<br>Maleic anhydride (17.6).<br>Itaconic acid (15.6). |
| J | Diethylene glycol (30.3).<br>Maleic anhydride (13.2).<br>Phthalic anhydride (21.7). |

In many cases, instead of polymerizing a single telomerized polyester with a single unsaturated alkyd resin, mixtures can be used of two or more telomerized polyesters with a single unsaturated aliphatic alkyd resin, or a single telomerized polyester with two or more unsaturated aliphatic alkyd resins, or a mixture of two or more telomerized polyesters with two or more unsaturated aliphatic alkyd resins. In conjunction with the alkyd resins, comonomers can be used which are copolymerizable with the telomerized polyester or with the unsaturated alkyd resins, or with both, for example, one or more telomerized polyesters can be used with one or more unsaturated aliphatic alkyd resins together with methyl methacrylates.

In addition to, or in lieu of the methyl methacrylate, other comonomers or mixtures of comonomers can be used, for example, the vinyl esters, that is, vinyl acetate, and the vinyl esters of saturated and unsaturated, and aliphatic, monobasic and polybasic acids, and more specifically the vinyl esters of the following acids: propionic, isobutyric, valeric, caprylic, capric, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc., esters of the aforementioned acids.

Other suitable comonomers are the acrylic and alkacrylic acids and their derivatives, such as their esters, amides and corresponding nitriles, for example, acrylic acid, methyl acrylate, butyl acrylate, allyl acrylate, ethylene glycol diacrylate, acrylonitrile, methacrylonitrile, methacrylic acid, methyl methacrylate, etc.; the itaconic acid monoesters and diesters, such as the methyl, ethyl, allyl, dimethallyl, the maleic and fumaric acid monoesters, diesters and their amide and nitrile compounds, such as ethyl allyl maleate, fumaryl dinitrile, dimethallyl fumarate, etc.; the ethers, such as methallyl allyl ether, vinyl allyl ether, vinyl methallyl ether, allyl crotyl ether, vinyl crotyl ether; cyanuric acid derivatives such as diallyl cyanurate, triallyl cyanurate, trivinyl cyanurate, or in general, triazine compounds having at least one polymerizable or copolymerizable unsaturated group attached directly or indirectly to the triazine ring, as well as the partial, soluble or fusible polymers of the hereinabove listed monomers, etc.

The modified unsaturated aliphatic alkyd resins of this invention can be used alone or with fillers, dyes, pigments, opacifiers, lubricants, plasticizers, natural and synthetic resins, or other modifying bodies in, for example, casting, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven fibrous cotton or glass materials, etc. They can also be used for the production of wire coatings and winding tapes, and for protectively coating impervious articles, such as metals, or for coating and impregnating articles such as paper, wood, cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one telomerized polyester of this invention and at least one unsaturated aliphatic alkyd resin, with or without modifying agents, can be cast under pressure while being irradiated.

In preparing the interpolymerization products of the unsaturated aliphatic alkyd resin and the telomerized polyester, the unsaturated alkyd resin can constitute as much as 98 or 99 percent by weight of the whole. In other cases the telomerized polyester alone, or admixed with aliphatic comonomers or modifiers, can constitute as much as 98 to 99 percent by weight of the whole.

In general, the proportions of the components used in a particular formulation will depend upon the particular properties desired in the interpolymer. For most applications, it is preferred to use 30 to 90 percent of the unsaturated aliphatic alkyd resin and from 10 to 70 percent of the telomerized polyester, since within these ranges interpolymers best adapted for most commercial applications can be produced.

Within these ranges the new interpolymers have a wide range of properties. For example, depending upon the particular telomerized polyester or mixture of telomerized polyesters used with the particular unsaturated aliphatic alkyd resin the particular properties thereof, the conditions of polymerization, such as the temperature, pressure, presence or absence of additives, etc., the irradiation dose, and the extent of polymerization, they can vary in the degree of hardness, rigidity and resistance to solvents.

In the intermediate stages of copolymerization, some form fluid compositions of varying viscosities and may be so used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acids, bases, salts, solvents, swelling agents, and the like.

When it is desired to modify the properties of the polymers of the telomerized polyesters of this invention, this can be accomplished by copolymerizing a mixture comprising at least one telomerized polyester with at least one copolymerizable unsaturated ethylenic, or acetylenic hydrocarbon radical, more particularly, a $CH_2=C<$ radical, such as vinyl, allyl, methallyl, vinylidene, etc., or with a copolymerizable compound containing a $—CH=CH<$, or a $—CH=C<$, or a $>C=C<$ grouping, for example, as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc.; vinyl ketones, methvinyl ketones, olefinic nitriles, such as acrylonitrile, methacrylonitrile, fumaryl nitrile, beta-cyanoethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, dimethyl itaconate, diethyl itaconate, diallyl itaconate; olefinic amides, for example, acrylamide, itaconamide, the maleic mono- and diamides, and the corresponding imides, etc.; the vinyl ethers, for example, vinyl butyl ether, vinyl isobutyl ether, vinyl cyclohexyl ether, the dienes, etc., for example, butadiene, isoprene, dimethyl butadiene, etc.

In preparing copolymers of the telomerized polyesters with other polymerizable comonomers such as methyl methacrylate, acrylonitrile, and the like, the telomerized polyesters can constitute as little as 0.1 percent by weight of the whole, whereas in other cases, the telomerized polyesters alone can constitute as much as 98 to 99 percent of the whole. As in the case of the copolymers with unsaturated aliphatic alkyd resins, the proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

Example I

In a suitable reaction apparatus equipped with a stirrer, reflux condenser, inert gas inlet, heating mantle, and thermostatic control for the reactor, are placed 28.8 parts of 2-hydroxypropyl methacrylate, 20 parts of maleic anhydride, and 0.25 part of hydroquinone. The apparatus is first deoxygenated by sweeping dry deoxygenated nitrogen through the apparatus and thereafter allowing a slow stream of nitrogen to pass through during the reaction. The mixture is heated to 125–130° C. for thirty minutes to give a quantitative yield of

Then six parts of ethylene glycol are added and the reaction continued for about four hours or until the acid number is substantially zero. There is obtained the telomerized oligomer

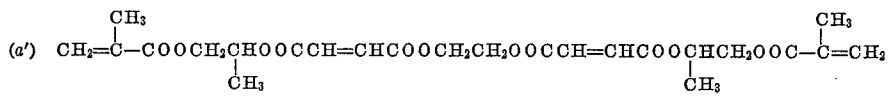

which is a slightly viscous, light-colored oily product.

When an equivalent amount of 2-hydroxypropylene acetate is substituted for the methacrylate there is obtained a viscous product having the formula

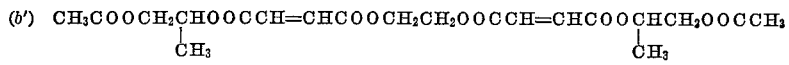

Example II

The procedure of Example I is repeated ten times using respectively instead of the 28.8 parts of 2-hydroxypropyl methacrylate:

(a) 26.0 parts of 2-hydroxyethyl methacrylate.
(b) 23.2 parts of 2-hydroxyethyl acrylate.
(c) 26.0 parts of 2-hydroxypropyl acrylate.
(d) 26.0 parts of 3-hydroxypropyl acrylate.
(e) 28.8 parts of 3-hydroxypropyl methacrylate.
(f) 26.0 parts of diethylene glycol monoacrylate.
(g) 28.8 parts of diethylene glycol monomethacrylate.
(h) 39.0 parts of 1,4-hexahydroxylylidene glycol monoacrylate.
(i) 33.0 parts of 1,4-cyclohexanediol acrylate.
(j) 45.6 parts of 1,10-decamethylene glycol acrylate.

There are obtained respectively

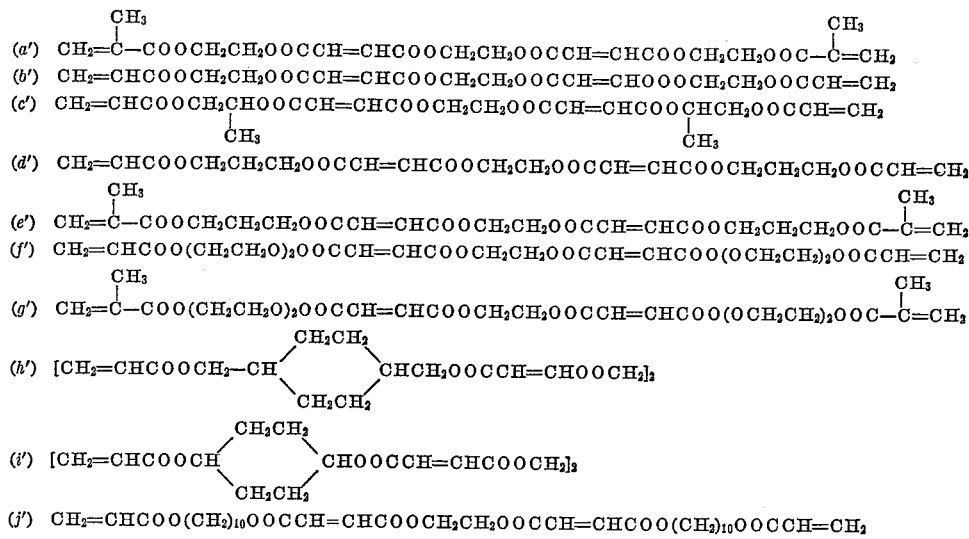

Example III

The procedure of Example I is repeated six times using respectively instead of the six parts of ethylene glycol:

(a) 9 parts of butylene glycol.
(b) 17.4 parts of decamethylene glycol.
(c) 11.8 parts of hexamethylene glycol.
(d) 7.6 parts of propylene glycol.
(e) 11.6 parts of 1,4-cyclohexanediol.
(f) 14.4 parts of 1,4-hexahydroxylylidene glycol.
(g) 15.0 parts of triethylene glycol.

There are obtained respectively

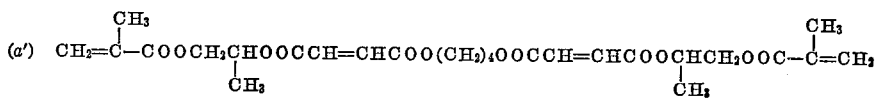

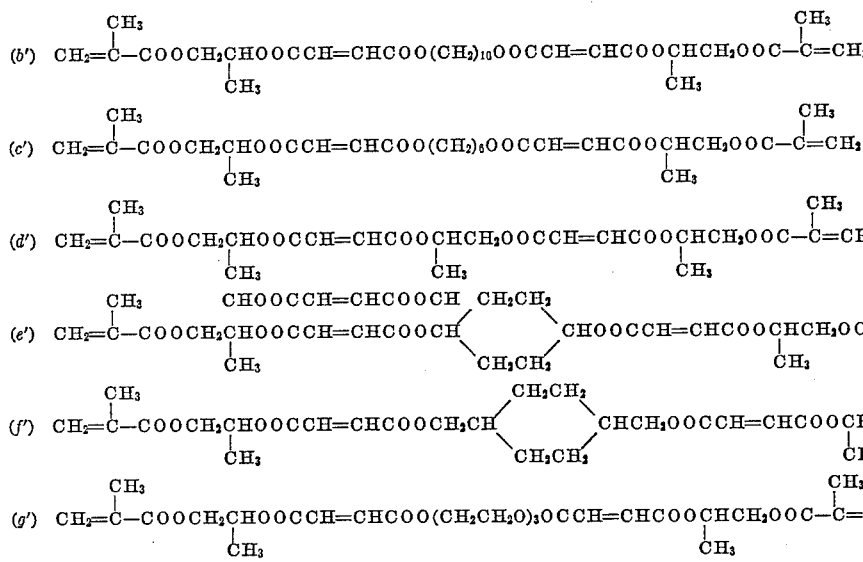

Example IV

The procedure of Example I is repeated using respectively instead of the 20 parts of maleic anhydride:

(a) 22.5 parts of citraconic anhydride.
(b) 30.8 parts of 1,2-tetrahydrophthalic anhydride.
(c) 22.5 parts of itaconic anhydride.
(d) 22.5 parts of mesaconic anhydride.

for twenty minutes at 130° C. Then there is added 6 parts of ethylene glycol, 0.15 part of toluene sulfonic acid, and 100 parts of toluene and the mixture refluxed until no more water of condensation is collected in the Dean-Stark trap. The mixture is then neutralized with solid sodium bicarbonate, filtered and the toluene removed by distillation at 15 mm. pressure, leaving

There are obtained respectively

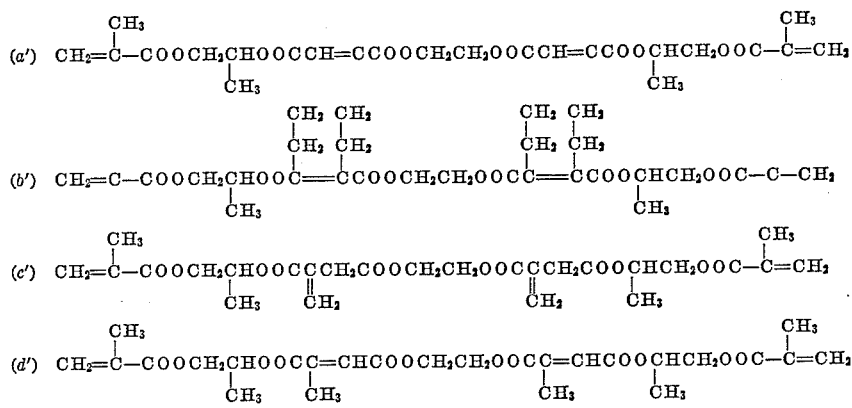

Example V

All of the radiation-sensitive acrylyl terminated polyesters of Examples I to IV inclusive can be prepared by alternate procedures as illustrated in the following methods A and B for the synthesis of

When the other reagents used in Examples I, II, III and IV are reacted by methods A and B, the desired products are also obtained.

*Method A.*—The reactor of Example I is equipped with a Dean-Stark trap to collect condensed water, and to the reactor is added 26 parts of 2-hydroxyethyl methacrylate, 0.2 part of hydroquinone and 20 parts of maleic anhydride and the mixture reacted in an inert nitrogen atmosphere

*Method B.*—The procedure of Example V is repeated with the exception of the order of addition of the reagents. The 20 parts of maleic anhydride and 6 parts of ethylene glycol are first reacted at 130° C., then the hydroquinone, the toluene, toluene sulfonic acid and the hydroxyethyl methacrylate are added and the reaction continued until no more water of condensation is collected, then the toluene is removed by distillation, leaving the same product as that of Example II(a') and Example V–A.

Example VI

To the Dean-Stark reactor of Example V–B there is added 116 parts of maleic acid, 260 parts of hydroxyethyl methacrylate, 1 part of toluene sulfonic acid, 500 parts of toluene, 1 part of hydroquinone and the mixture refluxed until 36 parts of water are collected in the trap. The toluene sulfonic acid is neutralized with calcium hydroxide, the solution filtered, and the toluene removed by distillation at reduced pressure, leaving (a) 

This product is related to the product of Example IIa, which can be written as

Example VII

The procedure of Example VI is repeated a number of times, but instead of using the 116 parts of maleic acid (1 mol. weight) equivalent molar weights of the following acids respectively are used:

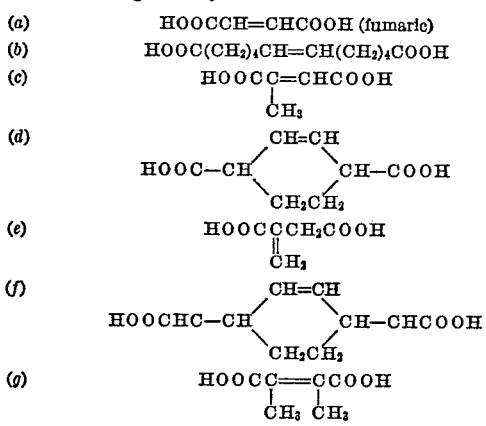

and there is obtained

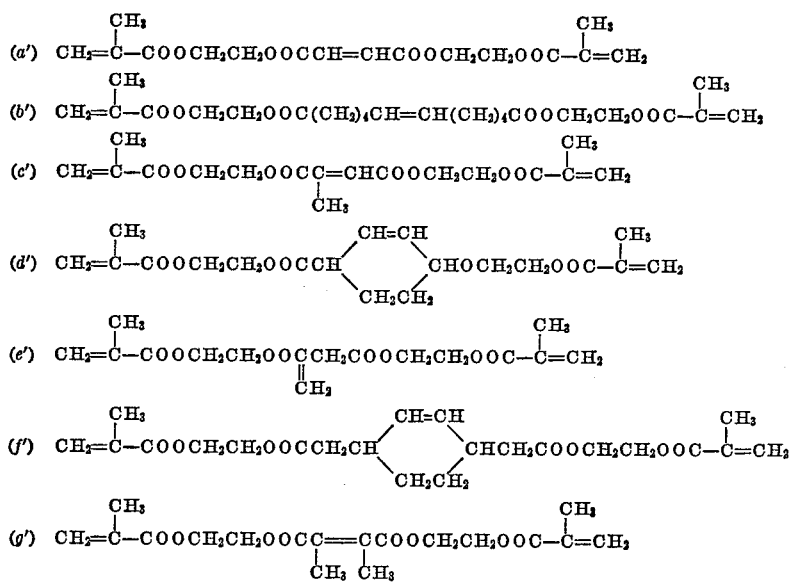

Example VIII

In the reactor of Example I there is placed 26 parts of hydroxyethyl methacrylate, 50 parts of carbon tetrachloride, 0.5 part of hydroquinone, 8 parts of sodium hydroxide dissolved in 50 parts of water, and to the stirred mixture is added, at 20° C. slowly over a period of one hour, 15.3 parts of fumaryl dichloride dissolved in 50 parts of carbon tetrachloride. The reaction mixture is then washed four times with 100 parts of water, dried over anhydrous sodium sulfate, filtered, and the carbon tetrachloride removed from the reaction product by distillation at 15 mm. pressure, leaving as the product

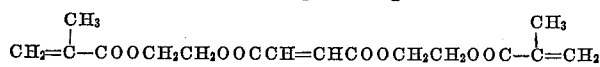

When 28.8 parts of 2-hydroxypropyl methacrylate are used in this procedure instead of 26 parts of hydroxyethyl methacrylate, there is obtained

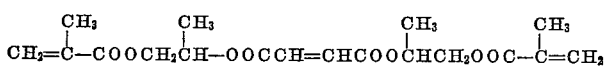

Example IX

To the reactor of Example I is added 24 parts of ethylene glycol and 49 parts of succinic anhydride (or 58 parts of succinic acid) and the mixture reacted at 180° C. for six hours or until titration of a sample with 1 N sodium hydroxide shows that it is substantially

The product is then transferred to the Dean-Stark reactor of Example V–B, to which is added 26 parts of 2-hydroxyethyl acrylate, 0.5 part of toluene sulfonic acid, 150 parts of toluene, 1 part of hydroquinone, and the mixture refluxed until no more water of condensation is collected in the trap. The mixture is then treated as in Example V–B, and there is isolated the product

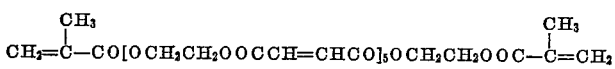

Example X

The procedure of Example IX is used except that 54 parts of ethylene glycol and 98 parts of maleic anhydride are used instead of 24 parts and 49 parts respectively, and there is obtained (a') 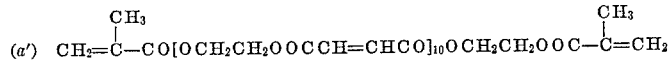

In a similar way by using 66 parts of ethylene glycol and 118 parts of maleic anhydride, there is obtained (b') 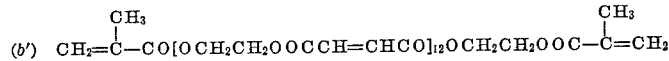

with 84 parts of ethylene glycol and 147 parts of maleic anhydride there is obtained (c') 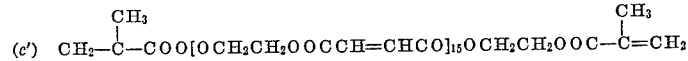

By varying the above ratios there is also prepared (d') 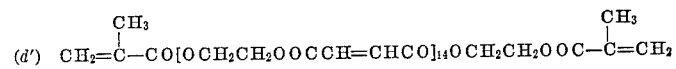

Example XI

The procedures of Examples IX and X are repeated using equivalent quantities of an aromatic dicarboxylic acid, phthalic anhydride, and appropriate multiples thereof, instead of the aliphatic dicarboxylic maleic anhydride, and there is obtained a series of products of the general formula

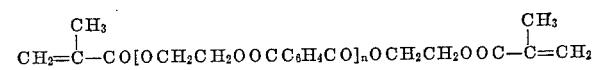

$n=1$ in sample $a'$,
$n=5$ in sample $b'$,
$n=10$ in sample $c'$,
$n=12$ in sample $d'$.

Example XII

The procedures of Examples IX and X are repeated using equivalent quantities of an aromatic dialcohol p-xylylidene glycol, $HOCH_2C_6H_4CH_2OH$, and appropriate multiples thereof, instead of ethylene glycol, and there is obtained a series of products of the general formula

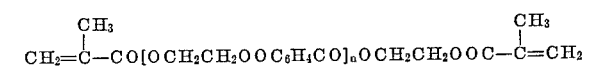

in which
$n=1$ in sample $a'$,
$n=5$ in sample $b'$,
$n=10$ in sample $c'$,
$n=15$ in sample $d'$.

EXAMPLE XIII

A sample of liquid polyester, $Ia'$, in a layer one-half inch thick is placed in an aluminum cup and exposed, while open to air, to the beam of a 1-mev. Van der Graaff accelerator. An increase in the viscosity of the sample is observed at 0.8 megarad and at 1.7 megarads the sample becomes completely crosslinked. When an identical sample is exposed to the electron beam of an Arco Mark I microwave linear accelerator operating at a beam energy of 8 mev., the sample also becomes insoluble and infusible at the same dosage, indicating that these telomerized polyesters are dose-rate independent.

Example XIV

The samples of Example XI, $a'$, $b'$, $c'$, $d'$, and Example XI, $a'$, $b'$, $c'$, $d'$, were irradiated by the procedure of Example XIII and no evidence of crosslinking is observed at 1, 2, 5, and 10 megarads. Some increase in viscosity is observed at higher dosages than 15 megarads and crosslinking becomes evident at about 23 megarads for the samples of Example XI, and at about 20 megarads for the samples of Example XII. These show the effect of the aromatic nuclei on the radiation dose required.

Example XV

The procedure of Example XIII is repeated seventeen times using respectively the samples of Example II, $a'$, $b'$, $c'$, $d'$, $e'$, $f'$, $g'$, $h'$, $i'$, $j'$, and Example III, $a'$, $b'$, $c'$, $d'$, $e'$, $f'$, $g'$. Sample $IIa'$ and $IIb'$ crosslink at between 1.35 and 1.5 megarads, and all the others, with the exception of Sample $IIIg'$ crosslink between 1.9 and 2.3 megarads, while $IIIg'$ crosslinks at 2.8 megarads. The products are very hard.

Example XVI

The producedure of Example XIII is repeated four times with samples of Experiment IV, $a'$, $b'$, $c'$, $d'$, and all of them crosslink with radiation doses in the range of 1.95 to 2.55 megarads to give very hard products.

Example XVII

All of the telomerized polyesters of Examples V to IX, inclusive, are irradiated by the procedure of Example XIII, and all crosslink at irradiation doses of less than 3.2 megarads.

Example XVIII

The telomerized polyesters of Example X are cast into glass vials by first heating them to 80° C. and then allowing them to cool to room temperature and exposed to the ionizing radiation beam of a 0.450 mev. electron accelerator. All of them become insoluble and infusible at the following dosages:

| | Megarads |
|---|---|
| Sample $Xa'$, $n=10$ | 4.2 |
| Sample $Xb'$, $n=12$ | 4.6 |
| Sample $Xc'$, $n=15$ | 6.8 |
| Sample $Xd'$, $n=14$ | 5.2 |

This data indicates that, a value of $n$ of less than 15, that is, of 14 or less represents an economical upper limit for these telomerized polyesters. This value of less than 15 can be obtained as an average value such as for example, by mixing equal portions by weight the sample of Example IX, in which $n=5$ and the sample of Example $Xc'$ in which $n=15$. Such a mixture crosslinks at a dosage of 3.7 megarads.

When a mixture of nine parts of the polymer of Example $IIa'$ and one part of the polymer of Example $Xc'$ are mixed, irradiation crosslinking is observed at 2.6 megarads.

Example XIX

| | Parts |
|---|---|
| Alkyd resin A | 80 |
| Telomerized polyester, Example $Ia'$ | 20 |

The alkyd resin A and the telomerized polyester are thoroughly and uniformly mixed and subjected to ionizing radiation and converted to an insoluble, infusible hard product at a dose of 3.15 megarads.

Fillers such as wood flour, alpha cellulose, shredded cellulose derivatives, asbestos, paper, cloth, sand, silica, calcium sulfate, etc., can be coated or impregnated with the mixture and the mass hardened by irradiation to produce formed articles of good appearance and excellent physical properties and improved heat resistance.

To improve the heat resistance further the foregoing procedure is modified using a higher ratio of telomerized polyester to the unsaturated alkyd as follows:

| | Parts |
|---|---|
| Alkyd resin A | 50 |
| Telomerized polyester | 50 | and

| | |
|---|---|
| Alkyd resin A | 75 |
| Telomerized polyester | 25 |

Compositions of the kind illustrated in this example have the advantage that they do not contain radical initiators and can be stored for long periods of time, and still are readily cured without the addition of catalyst by the simple expedient of subjecting them to irradiation.

Example XX

The procedure of Example XIX is repeated except that instead of alkyd resin A, there is used alkyd resin B and infusibility and insolubility is obtained at 2.8-3.8 megarads of irradiation.

The compositions of Examples XIX and XX can be used as room temperature, low pressure laminating resins for the preparation of reinforced laminates from glass mats or fabrics.

It will be understood of course that this invention is not limited to the interpolymerization of alkyd resins A and B with the telomerized polyester of Example I$a'$ and that another acrylyl telomerized polyester alone or in combination can be used, for example, the telomerized polyesters of Examples II to X, inclusive, can be used.

In contrast, when the aromatic containing telomerized polyesters of Examples XI and XII are used, irradiation doses in excess of 18 megarads are required to produce hard infusible polymers.

Similarly, high irradiation doses in excess of 16 megarads are required when the aromatic containing alkyd resin J is used with the acrylyl telomerized polyesters in contrast to the use of alkyd resin C, D, E, H and I which become infusible and insoluble in the range of 3.8 to 4.0 megarads.

The use of unsaturated alkyd resin G, which is an acrylyl terminated unsaturated alkyd in admixtures with the acrylyl telomerized aliphatic type polyesters, for example, the polyesters of Examples I, II and III is particularly beneficial since in all cases crosslinking occurs within the range of 1.6 to 2.0 megarads.

Example XXI

A smoothly sanded pineboard 12 inches by 36 inches and ⅝-inch thick is coated on one surface with a mixture of equal parts of polyester of Example II$a'$ and Example IX to produce a layer of polyester 0.005-inch in thickness, and the board is progressed under the sweeping beam of the linear accelerator to be given a uniform dose of 2.9 megarads. The finished board has the appearance of a high gloss varnished lumber.

When the above polyester mixture is blended and milled with 60 parts of titanium dioxide pigment (paint grade) and the pigmented polyester applied to wood, fiber board or concrete block, a porcelainized finish is obtained when the coating is irradiated.

Example XXII

Fifty parts of the telomerized polyester of Example I$a$ is diluted with 10 parts of glycol dimethacrylate and a concrete panel ⅛-inch thick is impregnated with this solution and the panel irradiated to a dosage of 3.0 megarads; a water-impervious panel is obtained.

Example XXIII

A mixture of 80 parts of exploded wood fibers of the type used to prepare fiber board, 12 parts of the telomerized polyester of Example X$b'$, 1 part of zinc stearate and seven parts of linseed oil are milled to uniformity, pressed into a board and given 4.3 megarads of irradiation. There is obtained a well knit, hard board which is readily paintable with either solvent type paints, or aqueous emulsion paints.

Example XXIV

Four parts of the polymer of Example X$b'$ are added to 10 parts of water containing 0.5% of sodium dioctyl sulfosuccinate as an emulsifying agent and the mixture emulsified in a colloidal mill. The emulsion of the telomerized polyester is added to 50 parts of prepuffed polystyrene beads mixed and the mixture tumbled until all the beads are uniformly coated. The water is then allowed to evaporate from the coated foamed beads which adhere slightly to each other. The coated foamed beads are then placed in a container such as a cardboard box and irradiated to a dose of about 3.6 megarads. By this process there is obtained a foamed structure in which the beads are all bonded with infusible bonds to each other, the shape of which conforms to the form of the container.

Example XXV

A uniform mixture of 40 parts of the diacrylyl polyester of Example I and 60 parts of a plastisol grade of polyvinylchloride having a molecular weight of about 25,000 is prepared. This is melt extruded into pipe and given an irradiation dose of 3 megarads. The polyvinylchloride is not degraded by this small dosage and the treatment makes the pipe insoluble and infusible so that it withstands hot water 210° F. and hot saturated brine at 215° F. without softening. It also withstands hot solutions of acetic acid, toluene, carbon tetrachloride, etc.

While certain features of this invention have been described in detail with respect to various embodiments thereof, it will, of course, be apparent that other modifications can be made within the spirit and scope of this invention and it is not intended to limit the invention to the exact details shown above except as they are defined in the following claims.

The invention claimed is:

1. A process for producing an improved polyester resin composition comprising the treatment of a highly radiation-sensitive telomerized diacrylyl polyester having the formula

wherein
R represents divalent unsaturated aliphatic hydrocarbon radical having 2-10 carbon atoms;
R' represents a divalent aliphatic hydrocarbon radical having 2-10 carbon atoms;
R" is selected from the class consisting of hydrogen and methyl; and
n is an integer having a value of 1-14;
with at least about 0.5 megarad and no more than about 8 megarads of high energy ionizing radiation equivalent to at least 100,000 electron volts.

2. The process of claim 1 in which said diacrylyl polyester is intimately admixed with a copolymerizable monomer, said diacrylyl polyester comprising 1-99 percent by weight of said copolymerizable mass and said copolymerizable monomer comprising 99-1 percent by weight of said copolymerizable mass.

3. The process of claim 1 in which said diacrylyl polyester is in intimate admixture with an unsaturated aliphatic alkyd resin, said diacrylyl polyester comprising 10-70 percent by weight of said copolymerizable mass and unsaturated aliphatic alkyd resin comprising about 30-90 percent of said copolymerizable mass.

4. The process of claim 1 in which said diacrylyl polyester has the formula $$CH_2=\underset{\underset{CH_3}{|}}{\overset{\overset{CH_3}{|}}{C}}-COOCH_2\underset{\underset{CH_3}{|}}{CH}OOCCH=CHCOOCH_2CH_2OOCCH=CHCOOCHCH_2OOC-\underset{\underset{CH_3}{|}}{\overset{\overset{CH_3}{|}}{C}}=CH_2$$

5. The process of claim 1 in which said diacrylyl polyester has the formula $$CH_2=\underset{\underset{CH_3}{|}}{\overset{\overset{CH_3}{|}}{C}}-COOCH_2CH_2OOCCH=CHCOOCH_2CH_2OOCCH=CHCOOCH_2CH_2OOC-\underset{\underset{CH_3}{|}}{\overset{\overset{CH_3}{|}}{C}}=CH_2$$

6. The process of claim 1 in which said diacrylyl polyester has the formula $$CH_2=CHCOOCH_2CH_2OOCCH=CHCOOCH_2CH_2OOCCH=CHCOOCH_2CH_2OOCCH=CH_2$$

7. The process of claim 1 in which said diacrylyl polyester has the formula $$CH_2=\underset{\underset{CH_3}{|}}{\overset{\overset{CH_3}{|}}{C}}-CO[OCH_2CH_2OOCCH=CHCO]_{10}OCH_2CH_2OOC-\underset{\underset{CH_3}{|}}{\overset{\overset{CH_3}{|}}{C}}=CH_2$$

8. The process of claim 1 in which said diacrylyl polyester has the formula

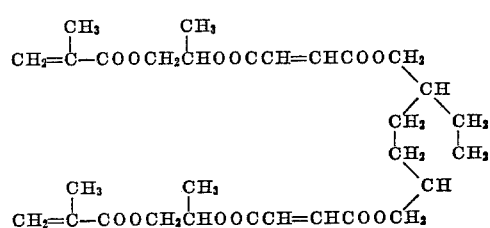

9. A process for producing an improved polyester resin composition comprising the treatment of a highly radiation-sensitive telomerized diacrylyl polyester having the formula $$CH_2=\underset{\underset{H}{|}}{\overset{\overset{R''}{|}}{C}}-COOR'O[OCRCOOR'O]_nOC-\underset{\underset{H}{|}}{\overset{\overset{R''}{|}}{C}}=CH_2$$

wherein
R represents a divalent unsaturated aliphatic hydrocarbon radical having 2–10 carbon atoms;

R' represents a divalent aliphatic hydrocarbon radical having 2–10 carbon atoms;

R'' is selected from the class consisting of hydrogen and methyl; and n is an integer having a value of 1–14; with at least about 0.5 megarad of high energy ionizing radiation equivalent to at least 100,000 electron volts.

References Cited

UNITED STATES PATENTS

| | | | |
|---|---|---|---|
| 2,379,251 | 6/1945 | Muskat et al. | 260—485 |
| 2,973,331 | 2/1961 | Kraft | 260—76 |
| 3,336,418 | 8/1967 | Dill | 260—884 |

OTHER REFERENCES

γ-Initiated Crosslinking of Unsaturated Polyesters, W. Burlant and J. Hinsch, Journal of Polymer science, vol. 61, pp. 303–309 (1962).

Chemical Abstracts, vol. 54, p. 6204f.

MURRAY TILLMAN, Primary Examiner

RICHARD B. TURER, Assistant Examiner

U.S. Cl. X.R.

260—2.5, 17, 17.4, 22, 40, 75, 485, 486, 861, 862; 117—161; 204—159.16, 159.19, 159.22

UNITED STATES PATENT OFFICE
CERTIFICATE OF CORRECTION

Patent No. 3,455,801                                                           July 15, 1969

Gaetano F. D'Alelio

It is certified that error appears in the above identified patent and that said Letters Patent are hereby corrected as shown below:

Column 13, at the end of formula (b′) in Example IV, "-$CH_2$" should read -- =$CH_2$ --.

Signed and sealed this 18th day of November 1969.

(SEAL)
Attest:

Edward M. Fletcher, Jr.                                  WILLIAM E. SCHUYLER, JR.
Attesting Officer                                                 Commissioner of Patents

PO-1050
(5/69)

UNITED STATES PATENT OFFICE
CERTIFICATE OF CORRECTION

Patent No. 3,455,801      Dated July 15, 1969

Inventor(s) Gaetano F. D'Alelio

It is certified that error appears in the above-identified patent and that said Letters Patent are hereby corrected as shown below:

Column 16, line 2 of Example IX, "succinic" should be ---maleic---.

Column 16, line 3 of Example IX, "succinic" should be ---maleic---.

SIGNED AND
SEALED
JAN 20 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

PO-1050
(5/69)

Patent No. 3,455,801            Dated July 15, 1969

Inventor(s)   Gaetano F. D'Alelio

It is certified that error appears in the above-identified patent and that said Letters Patent are hereby corrected as shown below:

Column 1, line 19 should read

SIGNED AND
SEALED
APR 14 1970

(SEAL)
Attest:

Edward M. Fletcher, Jr.
Attesting Officer

WILLIAM E. SCHUYLER, JR.
Commissioner of Patents